US012361356B2

(12) United States Patent
Bradbury et al.

(10) Patent No.: US 12,361,356 B2
(45) Date of Patent: *Jul. 15, 2025

(54) SYSTEM FOR MANAGING RESOURCES AND SCHEDULING, AND RELATED METHOD AND SOFTWARE

(71) Applicant: STOKE Space Technologies, Inc., Kent, WA (US)

(72) Inventors: Brent Andrew Bradbury, Seattle, WA (US); Andrew Lapsa, Seattle, WA (US)

(73) Assignee: STOKE Space Technologies, Inc., Kent, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/625,561

(22) Filed: Apr. 3, 2024

(65) Prior Publication Data

US 2024/0265326 A1  Aug. 8, 2024

Related U.S. Application Data

(63) Continuation of application No. 18/490,510, filed on Oct. 19, 2023, now Pat. No. 11,977,999, which is a continuation of application No. 18/361,607, filed on Jul. 28, 2023, now Pat. No. 11,823,108.

(60) Provisional application No. 63/379,466, filed on Oct. 14, 2022.

(51) Int. Cl.
*G06Q 10/0633* (2023.01)

(52) U.S. Cl.
CPC ............................... *G06Q 10/0633* (2013.01)

(58) Field of Classification Search
CPC ........................................... G06Q 10/00–50/00
USPC .................................................. 705/7.11–7.42
See application file for complete search history.

(56) References Cited

U.S. PATENT DOCUMENTS

| | | | | |
|---|---|---|---|---|
| 6,115,646 A | * | 9/2000 | Fiszman | G06Q 10/10 |
| | | | | 700/86 |
| 6,279,009 B1 | * | 8/2001 | Smirnov | G06Q 10/06 |
| | | | | 707/999.102 |
| 6,338,053 B2 | * | 1/2002 | Uehara | G06F 16/284 |
| | | | | 705/28 |

(Continued)

OTHER PUBLICATIONS

Eshuis, Rik, and Roel Wieringa. "Verification support for workflow design with UML activity graphs." Proceedings of the 24th international conference on Software engineering. 2002. (Year: 2002).

(Continued)

*Primary Examiner* — Alan S Miller
(74) *Attorney, Agent, or Firm* — Pillsbury Winthrop Shaw Pittman LLP

(57) ABSTRACT

A system for managing resources and scheduling is disclosed. The system includes a client computer, software executable by the client computer for providing a user interface, a server in data communication with the client computer, a database for storing data in a hierarchical data structure, and a data fusion engine executing on the server. The hierarchical data structure includes a parent node and child nodes linked to the parent node. The data fusion engine is configured to log a workflow to at least one of the child nodes based on user input received via the user interface. A related method and software is also disclosed.

29 Claims, 11 Drawing Sheets

(56) References Cited

U.S. PATENT DOCUMENTS

| | | | |
|---|---|---|---|
| 7,822,706 B1* | 10/2010 | Baltazar | G06Q 10/10 |
| | | | 707/802 |
| 8,244,668 B1* | 8/2012 | Baltazar | G06Q 10/06 |
| | | | 707/802 |
| 8,738,414 B1* | 5/2014 | Nagar | G06Q 10/103 |
| | | | 705/7.12 |
| 9,348,489 B1* | 5/2016 | Cline | G06F 3/0482 |
| 9,629,928 B1* | 4/2017 | Olsen | A61K 48/00 |
| 10,852,712 B2 | 12/2020 | Ben-Bassat et al. | |
| 2003/0065574 A1 | 4/2003 | Lawrence | |
| 2003/0217054 A1* | 11/2003 | Bachman | G06Q 10/107 |
| 2004/0015487 A1* | 1/2004 | Lin | G06F 16/24534 |
| 2004/0117795 A1* | 6/2004 | Wang | G06Q 10/10 |
| | | | 718/106 |
| 2004/0205711 A1* | 10/2004 | Ishimitsu | G06F 9/451 |
| | | | 717/116 |
| 2008/0065448 A1* | 3/2008 | Hull | G06Q 10/06 |
| | | | 705/7.26 |
| 2009/0281777 A1* | 11/2009 | Baeuerle | G06Q 10/06 |
| | | | 703/6 |
| 2010/0106282 A1* | 4/2010 | Mackelprang | G06Q 10/06 |
| | | | 700/115 |
| 2010/0322256 A1* | 12/2010 | Riley | H04L 45/64 |
| | | | 370/400 |
| 2011/0225565 A1* | 9/2011 | van Velzen | G06F 9/5038 |
| | | | 705/348 |
| 2011/0251975 A1 | 10/2011 | Evans | |
| 2014/0047028 A1* | 2/2014 | Buth | G06F 9/546 |
| | | | 709/204 |
| 2015/0127412 A1* | 5/2015 | Kothandaraman | |
| | | | G06Q 30/0635 |
| | | | 705/7.26 |
| 2016/0154910 A1* | 6/2016 | Altare | G06Q 10/06 |
| | | | 703/13 |
| 2020/0134001 A1* | 4/2020 | Kantamsetty | G06F 16/2246 |
| 2021/0192450 A1 | 6/2021 | Bachant | |

OTHER PUBLICATIONS

Chen, Sen, et al. "Top-down human-cyber-physical data fusion based on reinforcement learning." IEEE Access 8 (2020): 134233-134245. (Year: 2020).

Tu, Y. L., S. Q. Xie, and J. J. Kam. "Rapid one-of-a-kind production." The International Journal of Advanced Manufacturing Technology 29 (2006): 499-510. (Year: 2006).

Apiliogullan, U.itfi. "Digital transformation in project-based manufacturing: Developing the ISA-95 model for vertical integration." International Journal of Production Economics 245 (2022): 108413. (Year: 2022).

Chinchanikar, Satish, and Avez A. Shaikh. "A review on machine learning, big data analytics, and design for additive manufacturing for aerospace applications." Journal of Materials Engineering and Performance 31.8 (2022): 6112-6130. (Year: 2022).

Non-Final Office Action for U.S. Appl. No. 18/786,544 dated Sep. 24, 2024, pp. 1-21.

Notice of Allowance for U.S. Appl. No. 18/361,607, dated Sep. 20, 2023, pp. 1-7 4.

Non-Final Office Action for U.S. Appl. No. 18/490,510, dated Jan. 16, 2024, pp. 1-21.

Notice of Allowance for U.S. Appl. No. 18/490,510, dated Mar. 6, 2024, pp. 1-9.

Final Office Action for U.S. Appl. No. 18/786,544 dated Jan. 22, 2025, pp. 1-59.

"How To Fix CPU Failure", 2022, https://ms.codes/en-GB/blogs/computer-hardware/how-to-fix-cpu-failure (Year: 2022), pp. 1-19.

Owen-Hill, https://robodk.com/blog/electronic-product-testing/, Jan. 2022, https://robodk.com/blog/electronic-product-testing/ (Year: 2022), pp. 1-13.

Murray, https://www.liveabout.com/bill-of-materials-2221363, Jan. 2019, https://www.liveabout.com/bill-of-materials-2221363 (Year: 2019), pp. 1-11.

* cited by examiner

SYSTEM FOR MANAGING RESOURCES AND SCHEDULING, AND RELATED METHOD AND SOFTWARE

RELATED APPLICATIONS

This application is a continuation of U.S. patent application Ser. No. 18/490,510, titled "SYSTEM FOR MANAGING RESOURCES AND SCHEDULING, AND RELATED METHOD AND SOFTWARE", filed Oct. 19, 2023, which is a continuation of U.S. patent application Ser. No. 18/361,607 titled "SYSTEM FOR MANAGING RESOURCES AND SCHEDULING, AND RELATED METHOD AND SOFTWARE", filed Jul. 28, 2023 (now U.S. Pat. No. 11,823,108), which claims benefit of and priority to U.S. Provisional Patent Application No. 63/379,466 titled "SYSTEM FOR MANAGING RESOURCES AND SCHEDULING, AND RELATED METHOD AND SOFTWARE" filed Oct. 14, 2023, the entireties of which are hereby incorporated by reference.

TECHNICAL FIELD

The present disclosure relates to a system for managing resources and scheduling, and a related method and software.

BACKGROUND

In complex manufacturing environments, the manufacturer needs to be able to optimize their resources and scheduling. This requires the collection and real-time monitoring of data from all stages of the manufacturing process, including procurement, design, assembly, testing, validation, and warehousing. The manufacturer needs a highly flexible system capable of adapting to disruptions, changes in part designs, availability of materials and machines, and customer demand. This is especially true in aerospace manufacturing environments, which require fast-paced hardware-focused iterative development and the need to maintain organizational knowledge. Modern aerospace companies need to design fast, build fast, test fast, learn fast, and iterate fast. These manufacturers aim to achieve a speed of development and a level of capital efficiency that is unique relative to other industries.

There are several known enterprise resource planning (ERP) software products that provide manufacturers with tools for managing resources and scheduling. However, existing ERP software products lack the flexibility needed to properly adapt to highly complex manufacturing environments such as those in the aerospace industry. For example, existing ERP software uses workflows to assign tasks and track project progress, but the software effectively assumes that users know what they want to build before they build it, which is not always the case. With existing ERP software, workflows can only be associated with known objects, and new workflows can only be created via custom, code-based programming. In environments with fast-paced hardware-focused iterative developments, software developers are never able to program new workflows fast enough to keep up with the rapid manufacturing changes.

Aspects of the present invention are directed to these and other problems.

SUMMARY

According to an aspect of the present invention, a system for managing resources and scheduling is provided. The system includes a client computer, software executable by the client computer for providing a user interface, a server in data communication with the client computer, a database for storing data in a hierarchical data structure and a data fusion engine executing on the server. The hierarchical data structure includes a parent node and child nodes linked to the parent node. The data fusion engine is configured to log a workflow to at least one of the child nodes based on user input received via the user interface.

According to another aspect of the present invention, a system is provided that includes a client computer, software executable by the client computer for providing a user interface, a server in data communication with the client computer, a database, and a data fusion engine executing on the server. The database includes a parent directory and nodes linked to the parent directory. Each of the nodes is associated with a respective real-world inventory item or a respective part to be manufactured. The data fusion engine is configured to log a workflow to at least one of the nodes based on user input received via the user interface.

According to another aspect of the present invention, a method for managing resources and scheduling is provided. The method includes the steps of: providing a user interface on a client computer; storing data in a hierarchical data structure having a parent node and a plurality of child nodes; and logging a workflow to at least one of the plurality of child nodes based on user input received via the user interface.

According to another aspect of the present invention, a non-transitory computer-readable storage medium that stores instructions to be executed by at least one computer is provided. The instructions, when executed, cause the at least one computer to perform steps including: providing a user interface on a client computer; storing data in a hierarchical data structure having a parent node and a plurality of child nodes; and logging a workflow to at least one of the plurality of child nodes based on user input received via the user interface.

According to another aspect of the present invention, a software-as-a-service (SaaS) platform is provided that includes a server, a database, and a data fusion engine executing on the server. The server is in data communication with a plurality of client computers. The database stores data in a hierarchical data structure having a parent node and child nodes linked to the parent node. The data fusion engine is configured to log a workflow to at least one of the child nodes based on user input received via at least one client computer of the plurality of client computers.

In addition to, or as an alternative to, one or more of the features described above, further aspects of the present invention can include one or more of the following features, individually or in combination:

- at least one of the child nodes is a leaf node, and the data fusion engine is configured to log the workflow to the leaf node;
- the workflow includes a workflow template and a workflow instance based on the workflow template;
- the workflow further includes a workflow scope linked to the workflow template, and the workflow scope identifies the child nodes and/or types of child nodes to which the workflow template and the workflow instance are logged or will be logged;
- the data fusion engine includes a workflow scope selector configured to log the workflow template and the workflow instance to the child nodes and/or types of child nodes identified by the workflow scope;

the workflow includes a task to be executed and a status of the task;

the data fusion engine is configured to monitor the workflow for detection of a change in the status of the task, the data fusion engine is configured to execute a rules-based action in response to the detection of the change in the status of the task, and the rules-based action includes at least one of instantiating another workflow instance, executing another workflow instance, generating an approval request, and transmitting an approval request;

the data fusion engine is configured to log the workflow to the at least one child node based on no-code user input received via the user interface;

the data fusion engine is configured to log the workflow to the at least one child node based on low-code user input received via the user interface;

the system is an enterprise system configured for use by a plurality of users, and the data fusion engine is configured to log a workflow to at least one of the child nodes based on user input received via the user interface from any of the plurality of users of the enterprise system;

the parent node is defined by a parent directory, at least some of the child nodes are defined by inventory item nodes, each corresponding to a real-world inventory item, and the data fusion engine is configured to log the workflow to at least one of the inventory item nodes based on user input received via the user interface;

at least some of the child nodes are defined by part nodes, each including a design file for a respective part to be manufactured, and the data fusion engine is configured to log a second workflow to at least one of the part nodes based on user input received via the user interface;

at least one of the child nodes is defined by a test node, and the data fusion engine is configured to log a third workflow to the test node;

the user interface includes at least one of an inventory interface for user interfacing with the inventory node, a parts library interface for user interfacing with the parts library node, and a test interface for user interfacing with the test node;

the data fusion engine is configured to edit data saved to hierarchical data structure based on user input received via the user interface;

the child nodes are defined by at least one of a file, a record, a field, a template, and an instance;

the data fusion engine is in data communication with an integrated SaaS tool, the workflow is at least one of created and edited by the integrated SaaS tool based on user input received via the user interface, and the data fusion engine is configured to log the workflow to the at least one child node after the workflow is at least one of created and edited by the integrated SaaS tool;

the data fusion engine is configured to create and edit workflows independent of the integrated SaaS tool based on user input received via the user interface;

the data fusion engine is configured to generate an index of all bill of materials (BOM) saved in the database, and the user interface includes a BOM interface for displaying the index;

the data fusion engine is configured to generate a queue including all completed, in progress, and/or pending tasks associated with workflows saved to the hierarchical data structure, and the user interface includes a queue interface for displaying the queue;

the data fusion engine is in data communication with a test sensor configured to generate test data regarding a real-world inventory item, at least one of the child nodes is an inventory item node corresponding to the real-world inventory item, and the data fusion engine is configured to receive the test data from the test sensor and log the test data to the inventory item node; and the data fusion engine is in data communication with a test sensor configured to generate test data regarding a part to be manufactured, at least one of the child nodes is a part node corresponding to the part to be manufactured, and the data fusion engine is configured to receive the test data from the test sensor and log the test data to the part node.

These and other aspects of the present invention will become apparent in light of the drawings and detailed description provided below.

DETAILED DESCRIPTION

Figure 1:
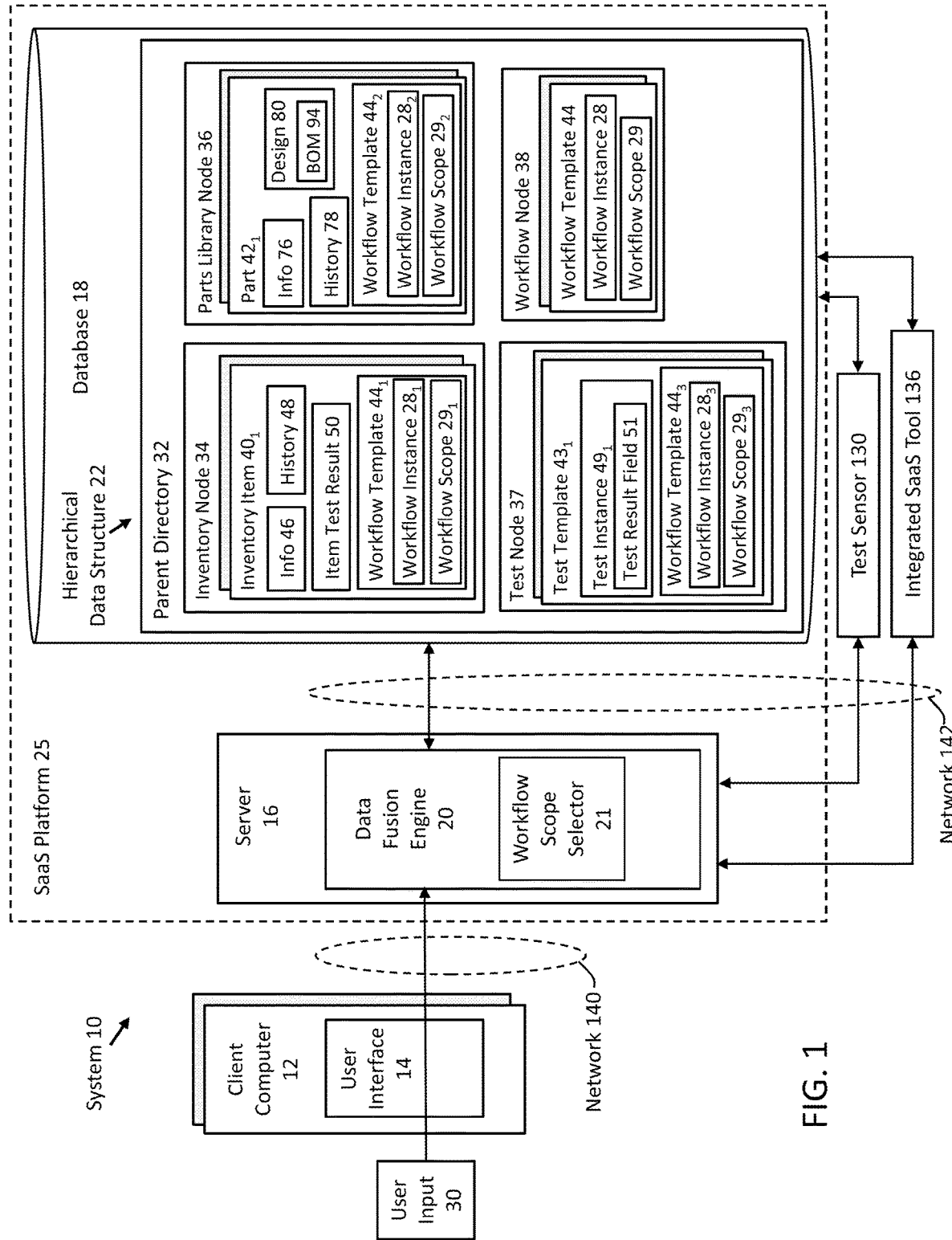
FIG. 1 schematically illustrates the present system for managing resources and scheduling.

Referring to FIG. 1, the present disclosure describes a system 10 for managing resources and scheduling, and a related method and software.

Figure 2:
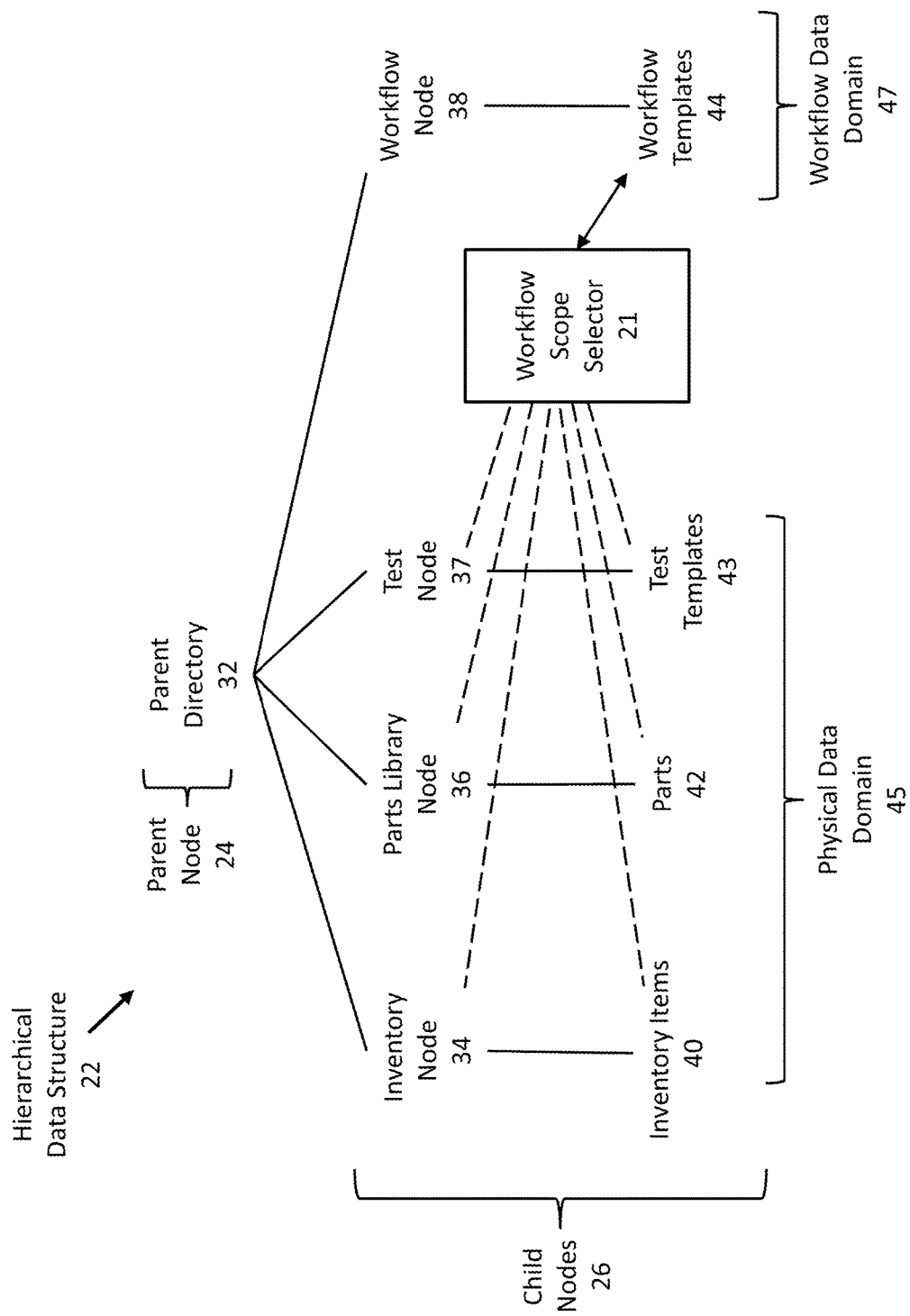
FIG. 2 schematically illustrates a portion of the hierarchical data structure of the database of FIG. 1.

Referring to FIG. 1, the system 10 includes one or more client computers 12, software executable by each of the client computers 12 for providing a user interface 14 thereon, at least one server 16 in data communication with the client computers 12, at least one database 18 in data communication with the server 16, and at least one data fusion engine 20 executing on the server 16. Referring to FIGS. 1 and 2, the database 18 is configured to store data in a hierarchical data structure 22 having a parent node 24 and a plurality of child nodes 26 linked to (e.g., descendent from) the parent node 24. The data fusion engine 20 is configured to log at least one workflow to at least one of the child nodes 26 based on user input 30 received via the user interface 14. The workflow includes at least one of a workflow template 44 and an instance of a workflow based on the workflow template 44 (hereinafter a "workflow instance 28").

In some embodiments, the workflow template 44 includes a workflow scope 29 defining one or more child nodes 26 and/or one or more types of child nodes 26 to which the workflow template 44 and corresponding workflow instances 28 are logged or will be logged. In such embodiments, the data fusion engine 20 includes a workflow scope selector 21 configured to control the logging of workflow instances 28 to certain child nodes 26 based on the workflow scope 29.

The child nodes 26 correspond to a wide range of objects, including real-world inventory items, designs for parts to be manufactured, and tests of the inventory items and/or parts, for example. The system 10 overcomes the above-mentioned problems with existing ERP software products in part by allowing all or substantially all users of the system 10 to log workflows to any one of these data objects.

Referring still to FIG. 1, the number of client computers 12 included in the system 10 can vary. In some embodiments, the system 10 is an enterprise system with hundreds or thousands of client computers 12 in data communication with the server 16, for example. In the illustrated embodiment, the server 16, database 18, data fusion engine 20, and hierarchical data structure 22 are elements of a software-as-a-service (SaaS) platform 25 that is accessed by users via their respective client computers 12.

Each of the client computers 12 includes one or more of a wide variety of electronic computing devices, including, for example, a personal computer, a mobile telephone (e.g., a smartphone), and a laptop. Similarly, the server 16 includes one or more of a wide variety of electronic computing devices, including, for example, the above-mentioned devices, a general purpose computer, a blade server, a rack-mounted server, a network server, a Web server, and other types of servers.

Each workflow is a computerized implementation of one or more tasks to be performed (e.g., by a manufacturer) to accomplish a predetermined objective (e.g., a manufacturing objective, a business objective, etc.). Each task of a workflow has one or more data inputs and computer-executable instructions that, when executed by the system 10, cause the computing system 10 to perform one or more actions based on the data inputs. Each workflow template 44 is a workflow in which at least one of the data inputs is a variable. Each workflow instance 28 is a workflow based on a corresponding workflow template 44. The workflow instance 28 is instantiated by the data fusion engine 20 based on user input 30 received via the user interface 14. When the workflow instance 28 is instantiated, a fixed data entry is assigned to at least one of the variable data inputs of the corresponding workflow template 44. The workflow instance 28 includes one or more tasks to be performed to accomplish a predetermined objective, and at least one status indicative of a status of one or more of the tasks.

The hierarchical data structure 22 can have various configurations. Referring to FIGS. 2-5, in the illustrated embodiment, the parent node 24 of the hierarchical data structure 22 is defined by a parent directory 32, and each child node 26 is a data node in the form of a subdirectory, a file, a record, a field, a template, an instance, or another data object.

Figure 3:
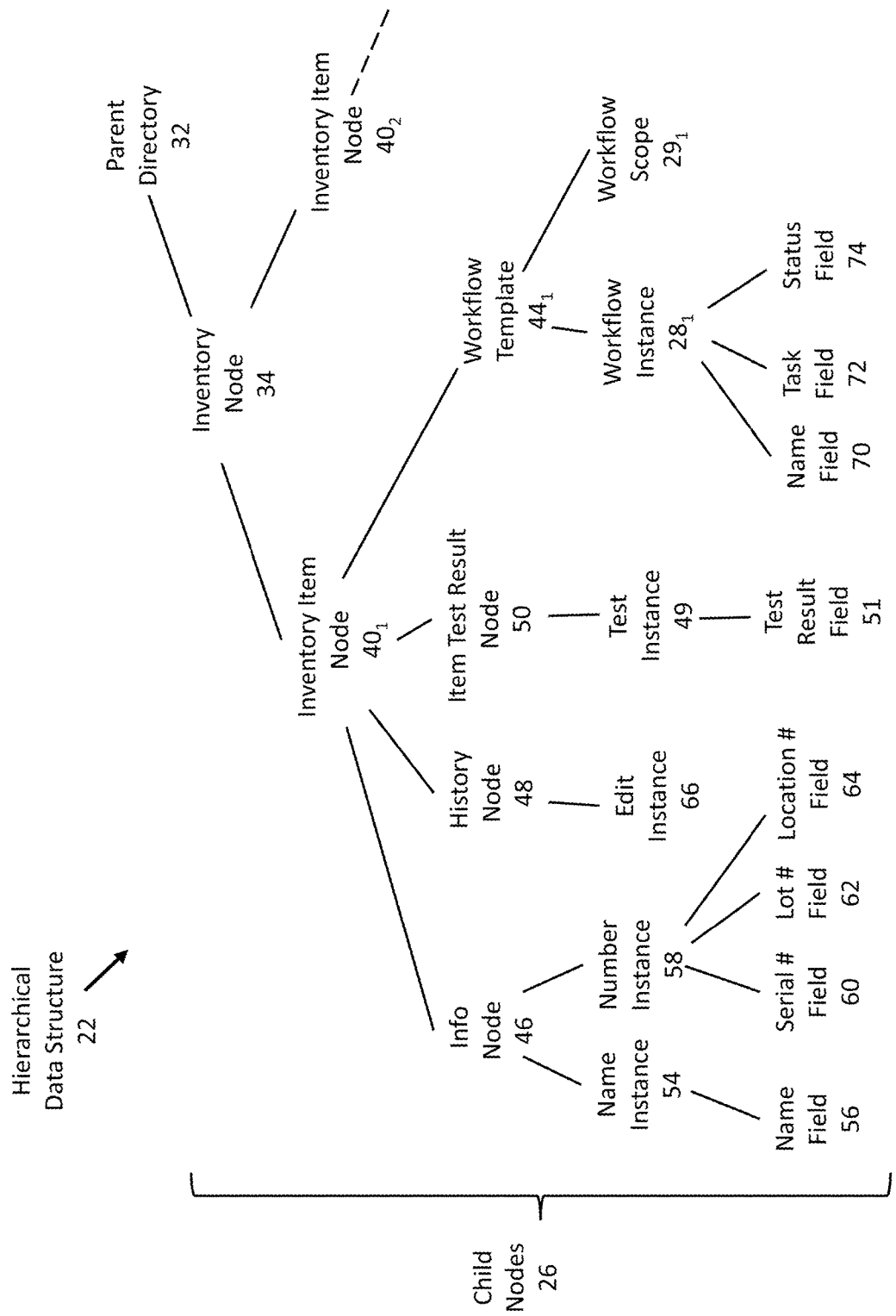
FIG. 3 schematically illustrates another portion of the hierarchical data structure of the database of FIG. 1.
Figure 4:
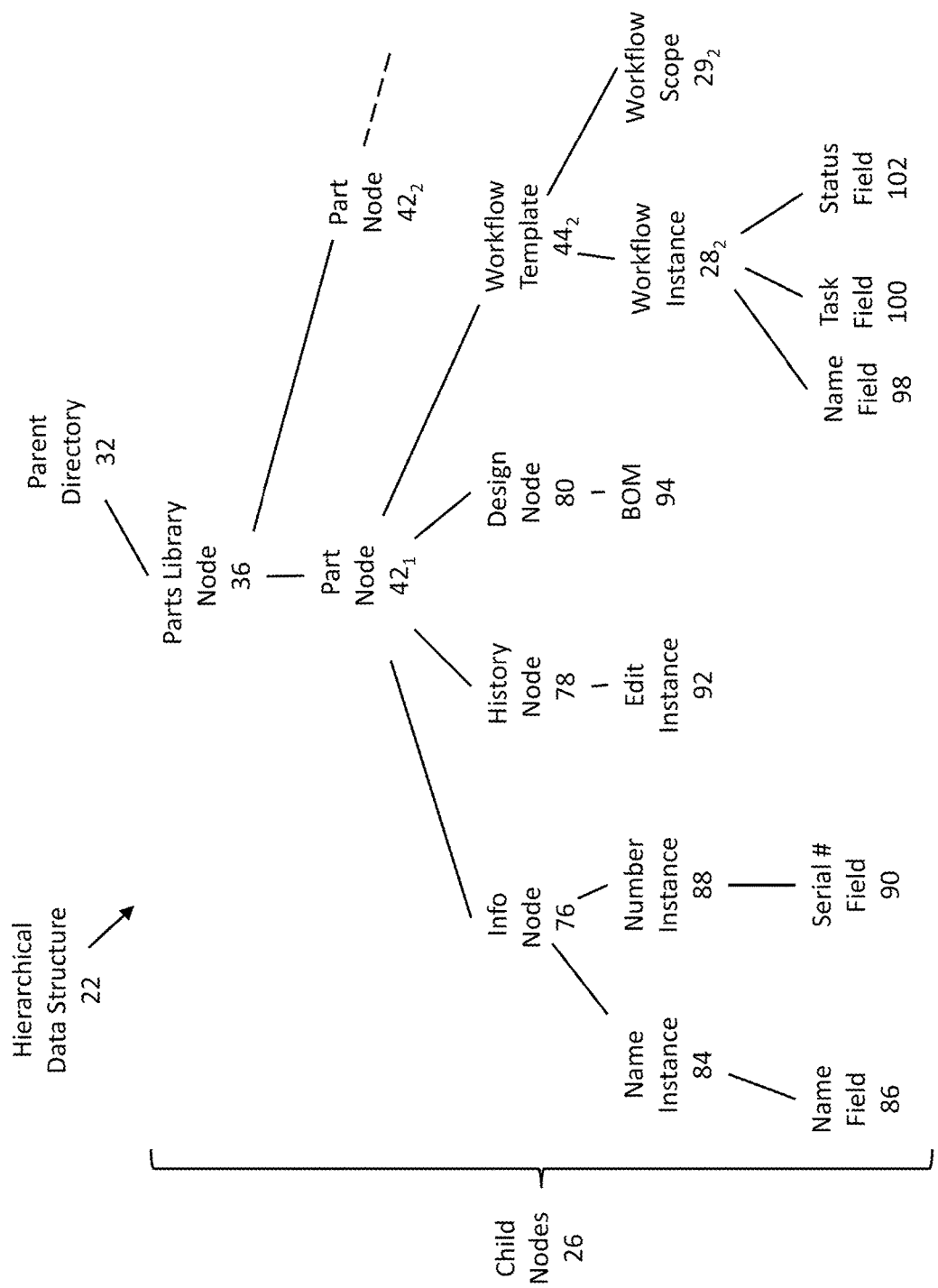
FIG. 4 schematically illustrates another portion of the hierarchical data structure of the database of FIG. 1.
Figure 5:
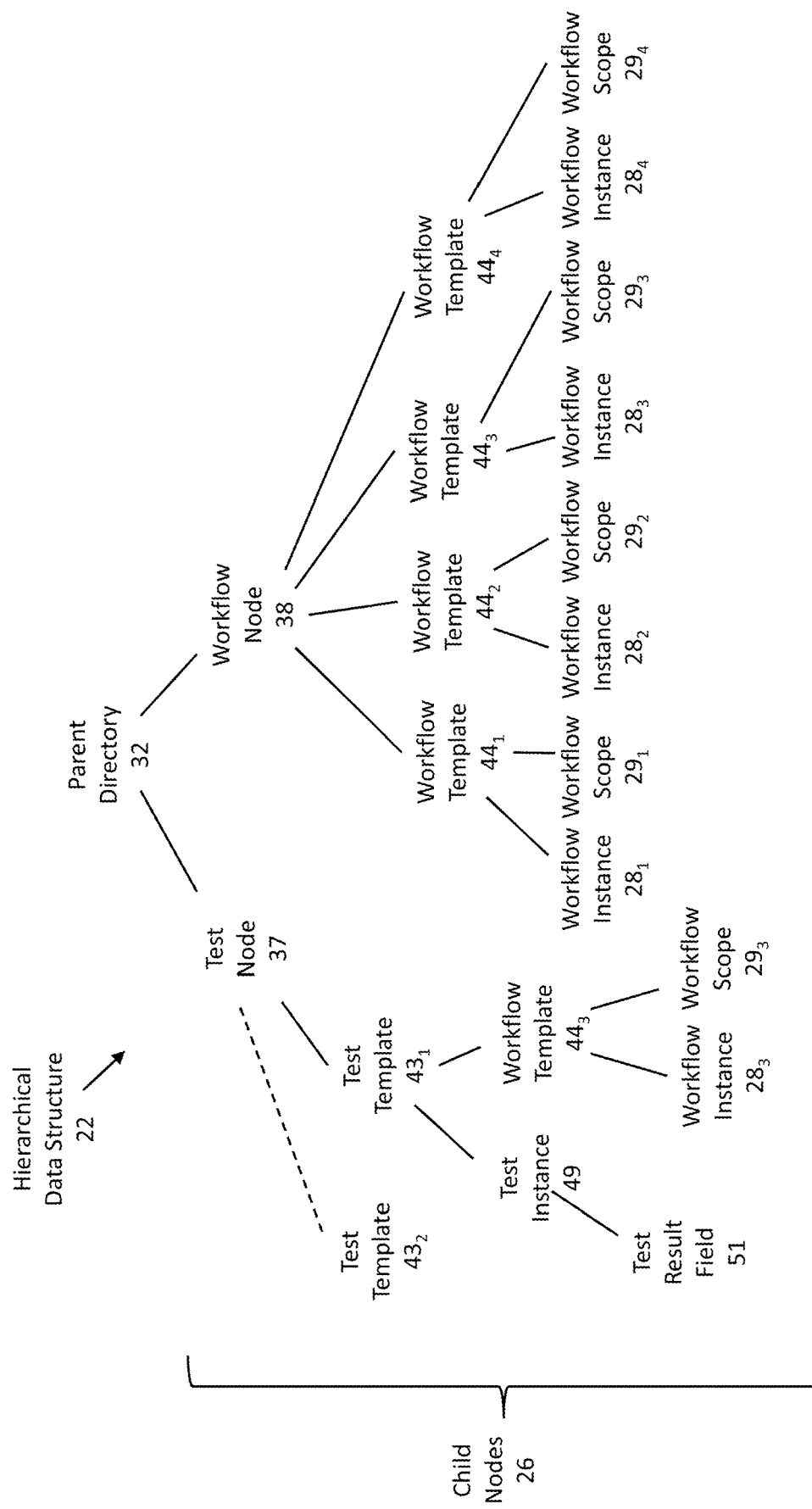
FIG. 5 schematically illustrates another portion of the hierarchical data structure of the database of FIG. 1.

Referring to FIG. 2, the child nodes 26 include an inventory node 34, a parts library node 36, a test node 37, and a workflow node 38. Referring to FIG. 3, the inventory node 34 is linked to a plurality of inventory item nodes 40, each correspond to a respective real-world inventory item (e.g., a manufactured part, an assembly of several manufactured parts, a raw material to be user for manufacturing a part, etc.). Referring to FIG. 4, the parts library node 36 is linked to a plurality of part nodes 42, each corresponding to a part to be manufactured. Referring to FIG. 5, the test node 37 is linked to a plurality of test templates 43, each corresponding to a test that can be performed on one or more inventory items and/or parts to be manufactured, for example. Referring still to FIG. 5, the workflow node 38 is linked to a plurality of workflow templates 44.

Referring still to FIG. 2, in the illustrated embodiment, the hierarchical data structure 22 can be characterized as having a physical data domain 45 and a workflow data domain 47. The physical data domain 45 includes the inventory node 34, the parts library node 36, the test node 37, and the respective child nodes thereof. The workflow data domain 47 includes the workflow node 38 and the workflow templates 44 linked thereto. In other embodiments, the system 10 includes more than one hierarchical data structure 22. In some such embodiments, a first hierarchical data structure includes the physical data domain 45 and a second hierarchical data structure includes the workflow data domain 47. In some such embodiments, the first and second hierarchical data structures can be saved to different databases that are in data communication with one another.

Referring to FIG. 3, in the illustrated embodiment, the inventory node 34 includes a plurality of inventory item nodes 40 linked thereto. The first inventory item node 40$_1$ includes an information node 46, a history node 48, an item test result node 50, and a workflow template 44$_1$ linked thereto. The information node 46 includes a name instance 54 with a name field 56, and a number instance 58 with a serial number field 60, a lot number field 62, and a location number field 64. The history node 48 includes an edit instance 66. The item test result node 50 includes a test instance 49 with a test result field 51. The workflow template 44$_1$ includes a workflow instance 28$_1$ based on the workflow template 44$_1$, and a workflow scope 29$_1$. The first workflow instance 28$_1$ includes a name field 70, at least one task field 72, and at least one status field 74. The second inventory item node 40$_2$ and other inventory item nodes not shown in FIG. 3 can have a hierarchical data sub-structure that is at least substantially the same or different than that of the first inventory item node 40$_1$.

Referring to FIG. 4, in the illustrated embodiment, the parts library node 36 includes a plurality of part nodes 42 linked thereto. The first part node 42$_1$ includes an information node 76, a history node 78, a design node 80, and a workflow template 44$_2$ linked thereto. The information node 76 includes a name instance 84 with a name field 86, and a number instance 88 with a serial number field 90. The history node 78 includes an edit instance 92. The design node 80 includes a bill of material (BOM) 94. In other embodiments, the design node 80 additionally or alternatively includes another design file (e.g., a blueprint file, an engineering drawing file, etc.). The workflow template 44$_2$ includes a second workflow instance 28$_2$ based on the workflow template 44$_2$, and a workflow scope 29$_2$. The second workflow instance 28$_2$ includes a name field 98, at least one task field 100, and at least one status field 102. The second part node 42$_2$ and other part nodes not shown in FIG. 4 can have a hierarchical data sub-structure that is at least substantially the same or different than that of the first part node 42$_1$.

Referring to FIG. 5, in the illustrated embodiment, the test node 37 includes a plurality of test templates 43 linked thereto. The first test template 43$_1$ includes a test instance 49 and a workflow template 44$_3$ linked thereto. The test instance 49 includes a test result field 51 linked thereto. The test instance 49 and test result field 51 are also logged to the item test result node 50 of the first inventory item node 40$_1$, as described above in reference to FIG. 3. The workflow template $44_3$ includes a workflow instance $28_3$ and workflow scope $29_3$. The second test template $43_2$ and other test templates not shown in FIG. 5 can have a hierarchical data sub-structure that is at least substantially the same as or different than that of the first test template $43_1$.

Referring still to FIG. 5, in some embodiments, the workflow node 38 includes at least the workflow templates $44_1$, $44_2$, $44_3$ logged to the child nodes 26 in the physical data domain 45 (see FIG. 2). The workflow node 38 further includes at least the respective workflow instances $28_1$, $28_2$, $28_3$ linked to those workflow templates $44_1$, $44_2$, $44_3$. In some embodiments, the workflow node 38 further includes one or more additional workflow templates 444 and workflow instances 284 that are not logged to the child nodes 26 in the physical data domain 45.

Referring again to FIG. 1, the data fusion engine 20 is configured to create data (including the workflow templates 44, workflow instances 28, and workflow scopes 29) and log the created data to the hierarchical data structure 22 based on user input 30 received via the user interface 14. The data fusion engine 20 is also configured to edit data (including the workflow templates 44, workflow instances 28, and workflow scopes 29) already logged to the hierarchical data structure 22, based on user input 30 received via the user interface 14. In some embodiments, the user input 30 is a no-code input or a low-code input.

In the illustrated embodiment, the data fusion engine 20 is configured to create and log workflows (e.g., workflow templates 44 and workflow instances 28) to child nodes 26 that are linked to (e.g., descendent from) the inventory node 34, the parts library node 36, the test node 37, and the workflow node 38. Notably, the data fusion engine 20 is configured to log workflows to at least one leaf node (i.e., a child node 26 without any descendant child nodes linked thereto). Referring to FIG. 5, for example, the first test template $43_1$ defined a leaf node until the data fusion engine 20 logged the workflow template $44_3$ and the test instance 49 to the first test template $43_1$.

In some embodiments, the data fusion engine 20 includes a rules engine that is operable to monitor the one or more workflows logged to the child nodes 26 and detect a change in the status of a task associated with the one or more workflows (a "workflow task"). In some such cases, the data fusion engine 20 is configured to execute one or more rules-based actions in response to detecting a change in the status of a workflow task. Such actions can include, for example, instantiating and/or executing another workflow instance based on a same or different workflow template, generating and/or transmitting an approval request (e.g., a signoff request) to one or more users of the system 10, etc.

In some embodiments, the data fusion engine 20 is configured to automatically log a history of all changes that occur to the data and/or data objects in the hierarchical data structure 22, including changes involving workflow templates 44 and workflow instances 28. In some embodiments, the child nodes 26 include at least first and second sibling nodes (i.e., child nodes with a common ancestor node), and the data fusion engine 20 is configured to log to the first sibling node a history of all changes to data in the second sibling node. Referring to FIG. 3, for example, the first inventory item node $40_1$ includes a history node 48 to which the data fusion engine 20 automatically logs a history of all changes to the information node 46, the item test result node 50, the workflow template $44_1$, and the child nodes 26 descendent therefrom. In the illustrated embodiment, the history node 48 includes a single edit instance 66 to which all changes are logged. In other embodiments, the data fusion engine 20 is configured to create a new edit instance each time a new change occurs.

Figure 6:
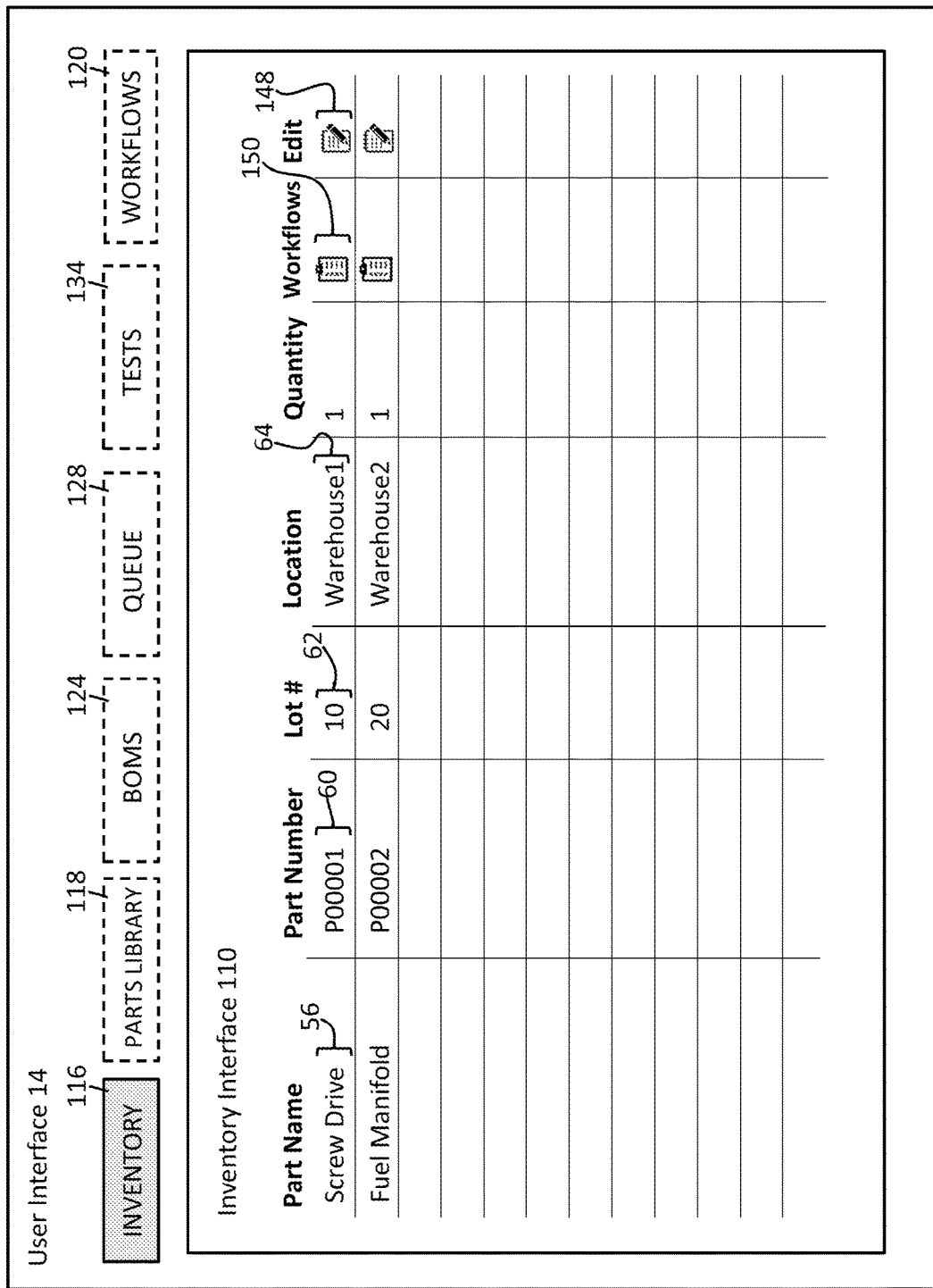
FIG. 6 schematically illustrates the inventory interface within the user interface of FIG. 1.
Figure 7:
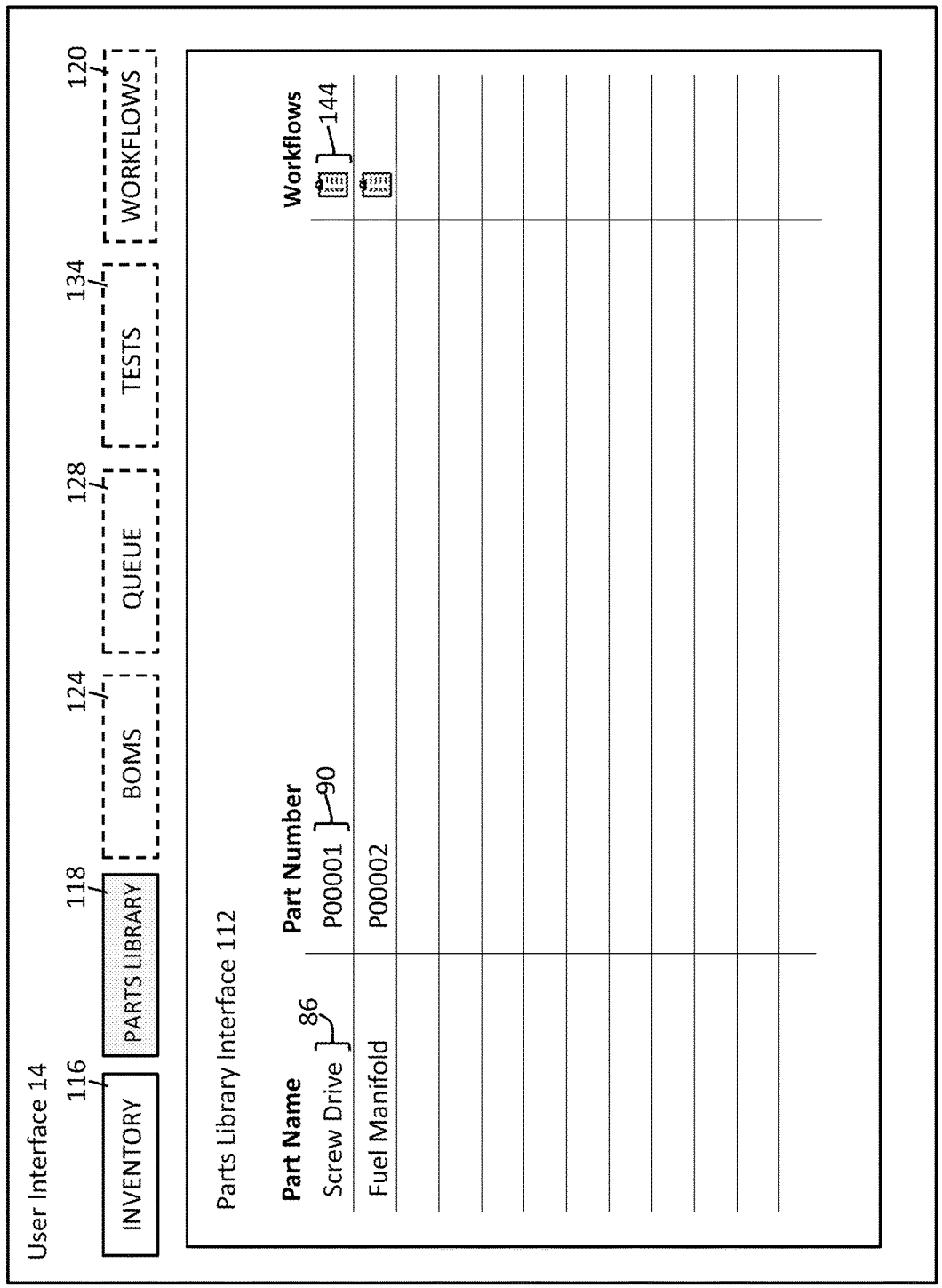
FIG. 7 schematically illustrates the parts library interface within the user interface of FIG. 1.
Figure 8:
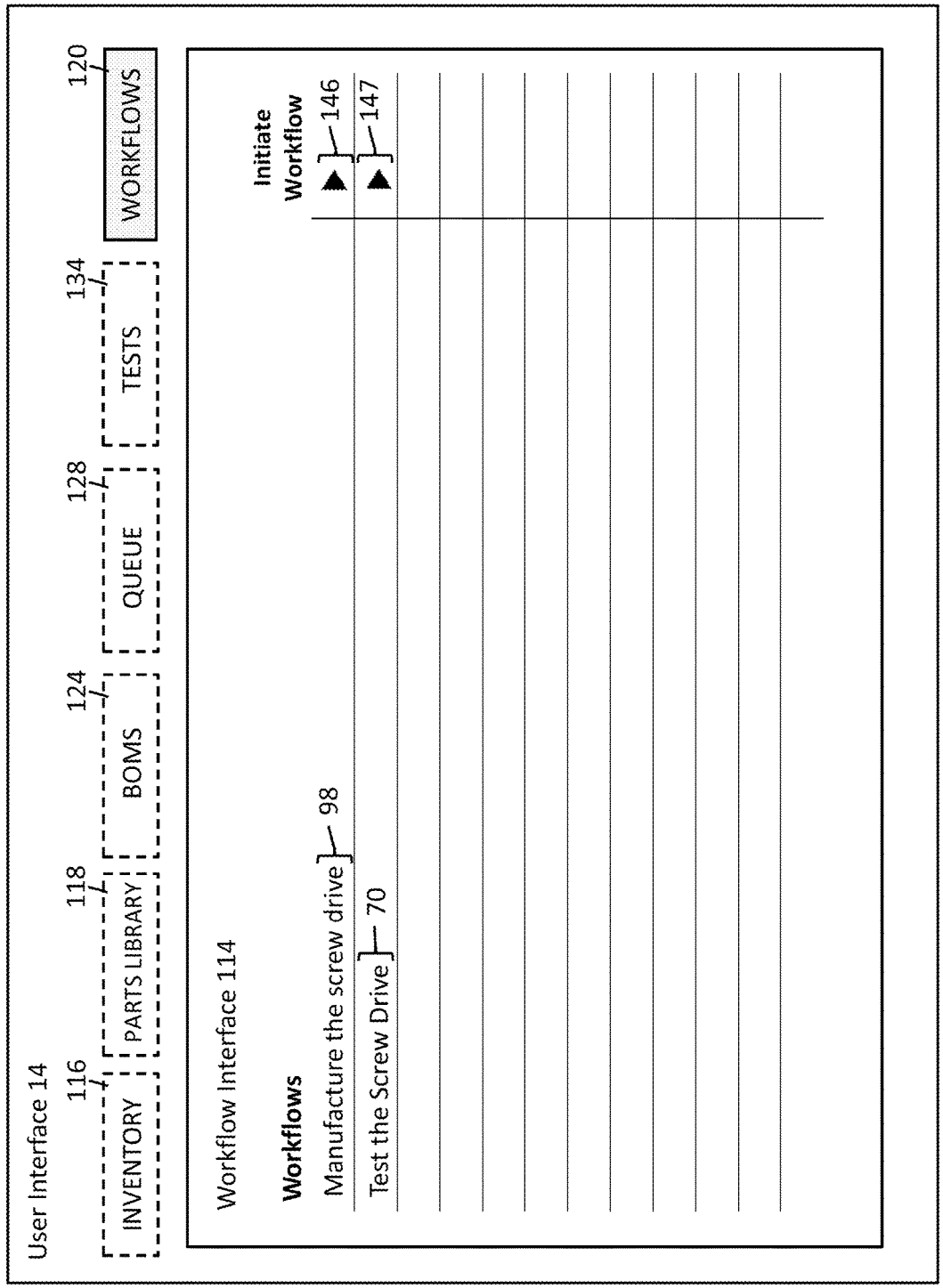
FIG. 8 schematically illustrates the workflow interface within the user interface of FIG. 1.

Referring to FIGS. 6-8, in some embodiments, the user interface 14 includes at least one of an inventory interface 110 (see FIG. 6) for interfacing with data logged to the inventory node 34, a parts library interface 112 (see FIG. 7) for interfacing with data logged to the parts library node 36, a test interface 132 (see FIG. 11) for interfacing with data logged to at least the test node 37, and a workflow interface 114 (see FIG. 8) for interfacing with data logged to the workflow node 38. Referring to FIGS. 6-8 and 11, in the illustrated embodiment the user interface 14 displays respective tabs 116, 118, 134, 120 for accessing the inventory interface 110, the parts library interface 112, the test interface 132, and the workflow interface 114.

Figure 9:
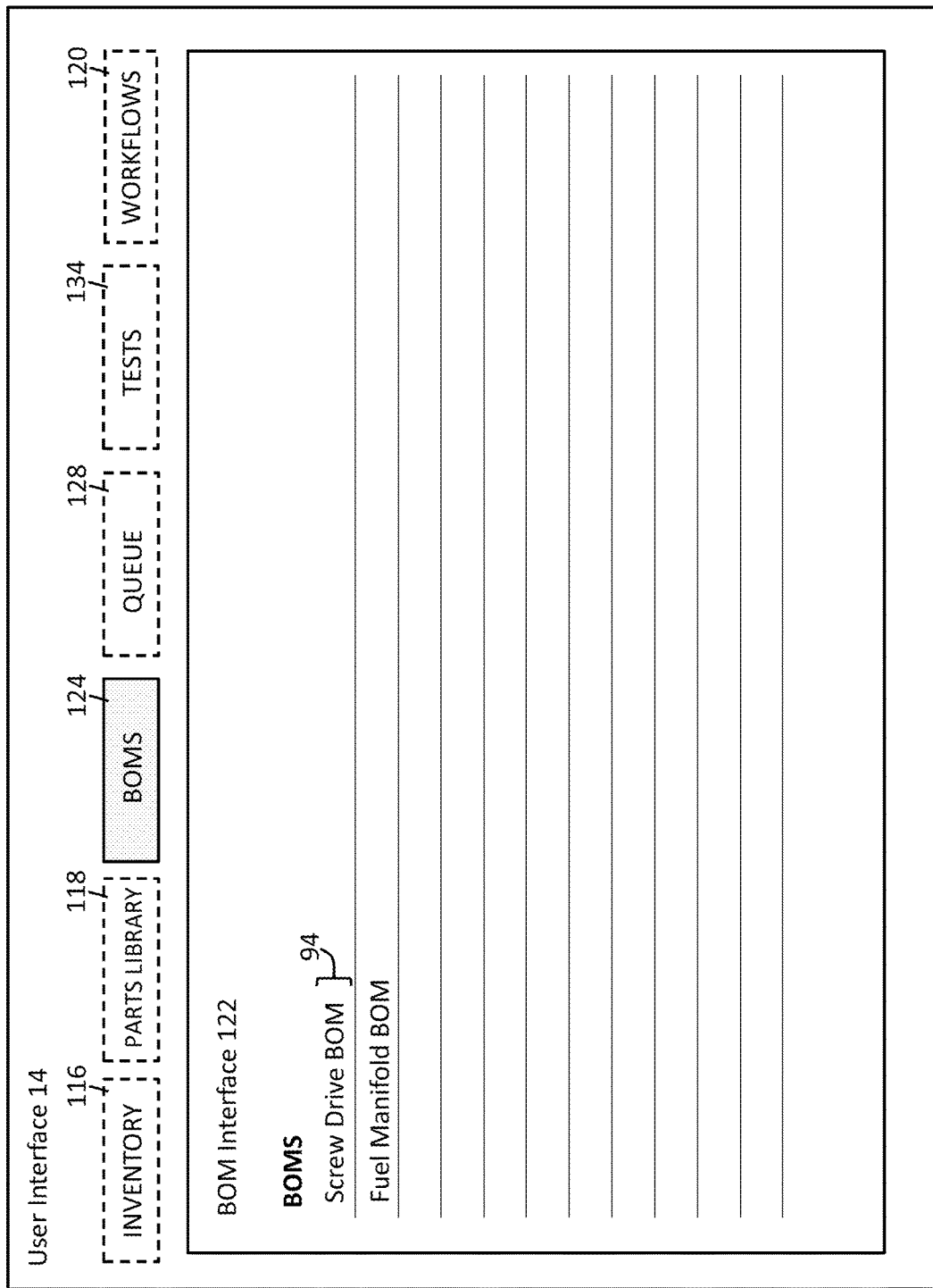
FIG. 9 schematically illustrates the bills of materials (BOM) interface within the user interface of FIG. 1.

In some embodiments, the data fusion engine 20 is configured to generate an index of all BOM data saved to the hierarchical data structure 22. Referring to FIG. 4, for example, the first part node $42_1$ includes at least one BOM 94, and the data fusion engine 20 is configured to generate an index of all such BOMs logged to the part nodes 42. Referring to FIG. 9, in some embodiments, the user interface 14 includes a BOM interface 122 for interfacing with the index of BOMs generated by the data fusion engine 20. The BOM interface 122 is accessible via a tab 124 displayed on the user interface 14.

Figure 10:
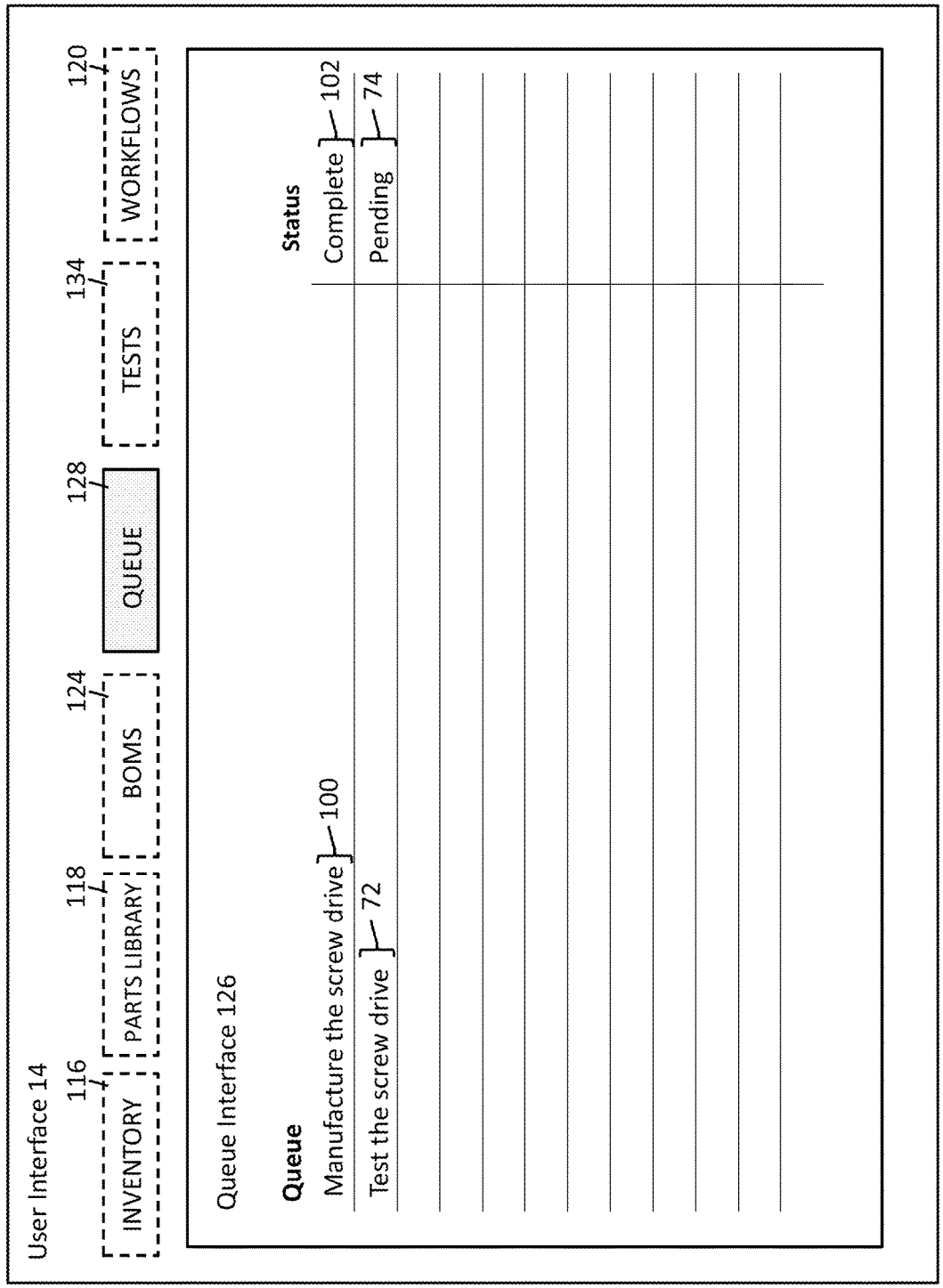
FIG. 10 schematically illustrates the queue interface within the user interface of FIG. 1.

In some embodiments, the data fusion engine 20 is configured to generate a queue that lists all completed, in progress, and/or pending tasks of the workflow instances 28 logged to hierarchical data structure 22. Referring to FIG. 10, in some embodiments, the user interface 14 includes a queue interface 126 for interfacing with the queue generated by the data fusion engine 20. The queue interface 126 is accessible via a tab 128 displayed on the user interface 14.

Referring to FIG. 1, in some embodiments, the data fusion engine 20 is in data communication with at least one test sensor 130 for generating test data regarding one or more inventory items and/or one or more parts to be manufactured. In the illustrated embodiment, the data fusion engine 20 is configured to: trigger the test sensor 130 to begin generating test data; receive the test data from the test sensor 130; and log the test data to a test result field 51 of a test instance 49 linked to at least one of the inventory node 34 (see FIG. 3), the parts library node 36 (see FIG. 4), and the test node 37 (see FIG. 5). In some embodiments, each inventory item node 40 includes a single test instance 49 to which all test results are logged. In other embodiments, the data fusion engine 20 is configured to create a new test instance 49 each time a new test is performed on the respective inventory item or part to be manufactured.

Referring to FIG. 1, in some embodiments, the data fusion engine 20 is in data communication with at least one integrated SaaS tool 136, and the integrated SaaS tool 136 is configured to create and/or edit data (including the workflow templates 44, workflow instances 28, and workflow scopes 29) to be logged to the hierarchical data structure 22 of the database 18 based on user input 30 received via the user interface 14. In some embodiments, the integrated SaaS tool 136 is Jira™ Microsoft Excel®, Google Sheets®, and/or another commercially available software capable of providing the functionality described herein.

In some embodiments, the integrated SaaS tool 136 creates and/or edits data (including the workflow templates 44, workflow instances 28, and workflow scopes 29) based on user input 30 received via the user interface 14, and data fusion engine 20 transmits the data from the integrated SaaS tool 136 to the hierarchical data structure 22 of the database 18 to be logged. In some such embodiments, the data fusion engine 20 is also configured to create and/or edit data (including the workflow templates 44, workflow instances 28, and workflow scopes 29) independent of the integrated SaaS tool 136.

The various connections between the components of the system 10 can include wired and/or wireless connections. Wired connections can be made by any type of conductive transmission line. Referring to FIG. 1, in some embodiments, one or more components of the system 10 can be connected via one or more network 140, 142 connections (e.g., via the Internet and/or via a personal area network (PAN), a local area network (LAN), a wide area network (WAN), etc.).

The functionality of the client computers 12, the server 16, the data fusion engine 20, the workflow scope selector 21, the database 18, the integrated SaaS tool 136, the test sensor 130, and/or components thereof can be implemented using analog and/or digital hardware (e.g., counters, switches, logic devices, memory devices, programmable processors, non-transitory computer-readable storage mediums), software, firmware, or a combination thereof. In some embodiments, the client computers 12, the server 16, the data fusion engine 20, the workflow scope selector 21, the database 18, the integrated SaaS tool 136, the test sensor 130, and/or one or more components thereof, can perform one or more of the functions described herein by executing software, which can be stored, for example, in a non-transitory computer-readable storage medium.

The terms "managing," "scheduling," "communicating," "logging," "linking," "allowing," "editing," "indexing," "generating," "saving," and variations thereof, are each used herein to refer to one or more actions and/or processes that can be implemented, for example, via a programmable processor or similar electronic computing device by manipulating and/or transforming data within the processor's memory into other data within the processor's memory.

Referring to FIG. 7, during operation of the system 10, a user may navigate to the parts library interface 112 and select a part to be manufactured. In the illustrated embodiment, the part associated with the first part node $42_1$ is to be selected for manufacturing. Referring to FIGS. 4 and 7, the part has the name "Screw Drive" logged to the name field 86 and the number "P00001" logged to the serial number field 90. The part has a workflow instance $28_2$ based on the workflow template $44_2$ (see FIG. 4).

Referring to FIG. 7, the user can initiate this workflow instance $28_2$ by clicking the icon 144 at the end of the row. If there were more than one workflow instance 28 associated with the part, clicking the icon 144 would cause a pop-up to appear. The pop-up would provide a list of the workflow instances that can be selected for the respective part.

Referring to FIG. 8, the user can toggle to the workflow interface 114 by clicking on the workflows tab 120 at the top of the user interface 14. In the workflow interface 114, the user can see the name "Manufacture the screw drive" that is logged to the name field 98 of the workflow instance $28_2$ (see FIG. 4). The user can initiate the workflow instance $28_2$ by clicking the icon 146 at the end of the row.

Referring to FIG. 9, the user can toggle to the BOM interface 112 by clicking on the BOM tab 124 at the top of the user interface 14. There, the user can view the BOM 94 associated with the part. In the BOM interface 122, a hyperlink with the text "Screw Drive BOM" will be displayed. The user can click on the hyperlink to open the BOM 94.

Referring to FIG. 10, after the part is manufactured, the queue interface 126 will update to indicate that the status field 102 of the workflow instance $28_2$ named "Manufacture the screw drive" has changed from "Pending" or "In Progress" to "Complete." The user can toggle to the queue interface 126 by selecting the queue tab 128 at the top of the user interface 14.

Figure 11:
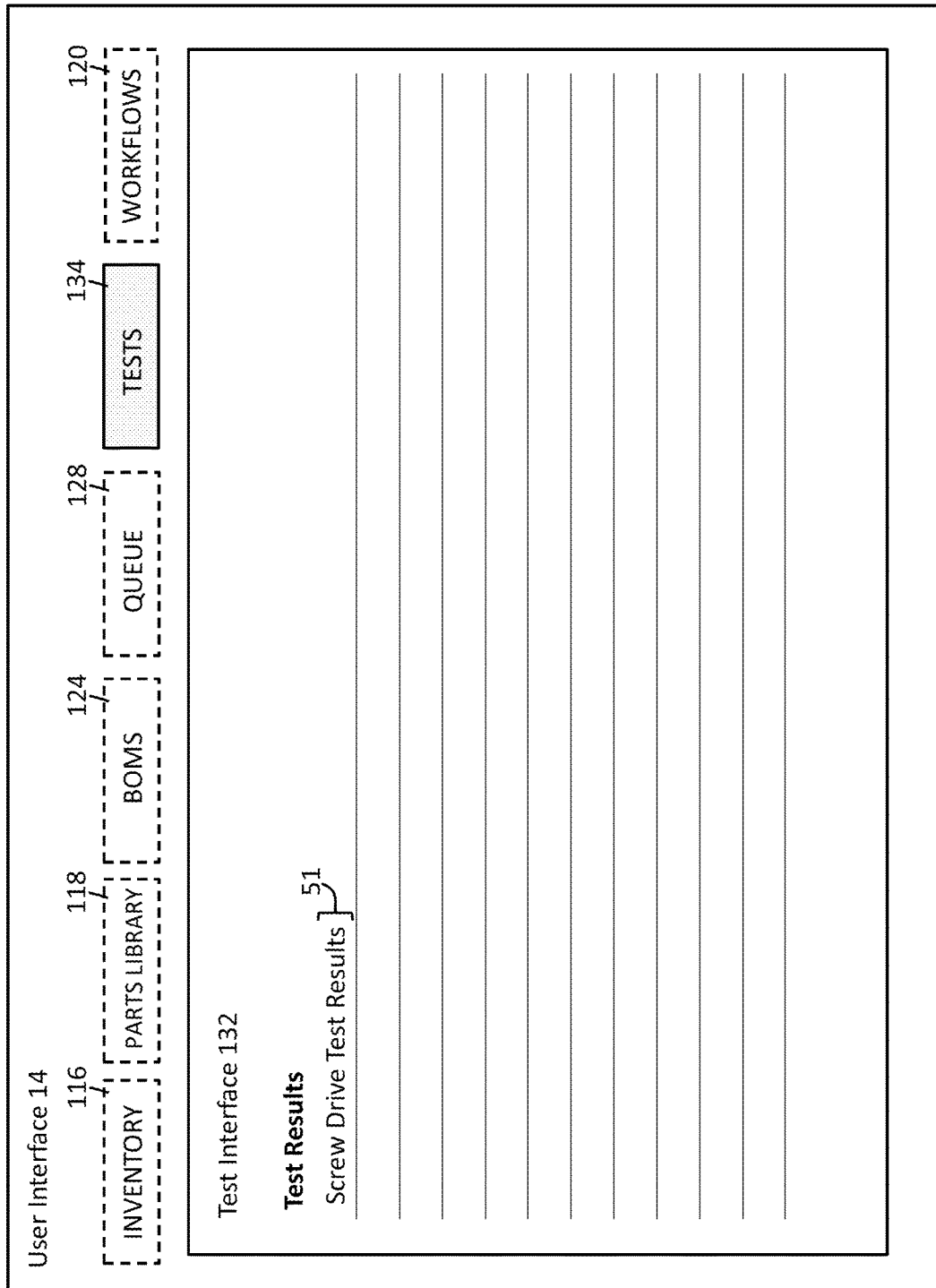
FIG. 11 schematically illustrates the test interface within the user interface of FIG. 1.

Referring to FIG. 3, after detecting the completion of the workflow instance $28_2$ (i.e., the manufacturing of the Screw Drive part), the data fusion engine 20 will create the inventory item node $40_1$ corresponding to the new Screw Drive inventory item. Referring to FIG. 6, the user can toggle to the inventory interface 110 by clicking on the inventory tab 116 at the top of the user interface 14. There, the user will see a row with the name field 56, serial number field 60, lot number field 62, and the location number field 64 associated with the Screw Drive inventory item. If it becomes necessary to edit any of the data displayed in the row, the user can do so by clicking on the edit icon 148 at the end of the row. Clicking on the icon 148 will open an editor interface through which the user can make the necessary edits to the data logged to the inventory item node $40_1$ associated with the Screw Drive inventory item. The user can also select the workflow icon 150 to view a pop-up listing any workflows associated with the part. Referring to FIG. 3 and FIG. 8, the inventory item node $40_1$ includes the workflow instance $28_1$ named "Test the Screw Drive", which is based on the workflow template $44_1$. Referring to FIG. 8, the user can initiate the workflow instance $28_1$ by clicking the icon 147 in the row with the name field 70 of "Test the Screw Drive". This will prompt the data fusion engine 20 to trigger the test sensor 130 to begin generating test data regarding the inventory item; receive the test data from the test sensor 130; and save the test data to the test result field 51 of the test instance 49 linked to the inventory node 34 (see FIG. 3) and the test node 37 (see FIG. 5). In the illustrated embodiment, the test instance 49 and test result field 51 are linked to the item test result node 50 of the first inventory item node $40_1$ (see FIG. 3) and to the first test template $43_1$ linked to the test node 37 (see FIG. 5). Referring to FIG. 11, the user can toggle to the test interface 132 by selecting the tests tab 134 at the top of the user interface 14. In the test interface 132, a hyperlink with the text "Screw Drive Test Results" will be displayed. The user can click on the hyperlink to open the test result field 51 including the test data. Referring to FIG. 10, after the test is complete, the queue interface 126 will update to indicate that the status field 74 of the workflow instance $28_1$ named "Test the Screw Drive" has changed from "Pending" or "In Progress" to "Complete."

Another aspect of the invention involves a method for managing resources and scheduling. The method includes the steps of: providing at least one user interface 14 on at least one client computer 12; storing data in at least one hierarchical data structure having at least one parent node 24 and a plurality of child nodes 26, and logging at least one workflow to at least one of the plurality of child nodes 26 based on user input 30 received via the at least one user interface 14.

Another aspect of the invention involves a non-transitory computer-readable storage medium that stores instructions to be executed by at least one computer. The instructions, when executed, cause the at least one computer to perform steps including: providing at least one user interface 14 on at least one client computer 12; storing data in at least one hierarchical data structure 22 having at least one parent node 24 and a plurality of child nodes 26; and logging at least one workflow to at least one of the plurality of child nodes 26 based on user input 30 received via the user interface 14.

As will be apparent in view of the above-described functionality of the system 10 and the various components thereof, the steps of the method can include various sub-steps, and/or various other steps in addition to the above-described steps. Furthermore, in some embodiments, the method can include more steps or less steps than those discussed herein.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The described embodiments may be understood in view of the following enumerated example embodiments:

1. A system for managing resources and scheduling, comprising:
   a client computer;
   software executable by the client computer for providing a user interface;
   a server in data communication with the client computer;
   a database for storing data in a hierarchical data structure having a parent node and child nodes linked to the parent node;
   a data fusion engine executing on the server, the data fusion engine configured to log a workflow to at least one of the child nodes based on user input received via the user interface.
2. The system of embodiment 1, wherein at least one of the child nodes is a leaf node; and
   wherein the data fusion engine is configured to log the workflow to the leaf node.
3. The system of embodiment 1, wherein the workflow includes a workflow template and a workflow instance based on the workflow template.
4. The system of embodiment 3, wherein the workflow further includes a workflow scope linked to the workflow template; and
   wherein the workflow scope identifies the child nodes and/or types of child nodes to which the workflow template and the workflow instance are logged or will be logged.
5. The system of embodiment 4, wherein the data fusion engine includes a workflow scope selector configured to log the workflow template and the workflow instance to the child nodes and/or types of child nodes identified by the workflow scope.
6. The system of embodiment 1, wherein the workflow includes a task to be executed and a status of the task.
7. The system of embodiment 6, wherein the data fusion engine is configured to monitor the workflow for detection of a change in the status of the task;
   wherein the data fusion engine is configured to execute a rules-based action in response to the detection of the change in the status of the task; and
   wherein the rules-based action includes at least one of instantiating another workflow instance, executing another workflow instance, generating an approval request, and transmitting an approval request.
8. The system of embodiment 1, wherein the data fusion engine is configured to log the workflow to the at least one child node based on no-code user input received via the user interface.
9. The system of embodiment 1, wherein the data fusion engine is configured to log the workflow to the at least one child node based on low-code user input received via the user interface.
10. The system of embodiment 1, wherein the system is an enterprise system configured for use by a plurality of users; and wherein the data fusion engine is configured to log a workflow to at least one of the child nodes based on user input received via the user interface from any of the plurality of users of the enterprise system.
11. The system of embodiment 1, wherein the parent node is defined by a parent directory;
    wherein at least some of the child nodes are defined by inventory item nodes, each corresponding to a real-world inventory item; and
    wherein the data fusion engine is configured to log the workflow to at least one of the inventory item nodes based on user input received via the user interface.
12. The system of embodiment 11, wherein at least some of the child nodes are defined by part nodes, each including a design file for a respective part to be manufactured; and wherein the data fusion engine is configured to log a second workflow to at least one of the part nodes based on user input received via the user interface.
13. The system of embodiment 12, wherein at least one of the child nodes is defined by a test node; and wherein the data fusion engine is configured to log a third workflow to the test node.
14. The system of embodiment 13, wherein the user interface includes at least one of an inventory interface for user interfacing with the inventory node, a parts library interface for user interfacing with the parts library node, and a test interface for user interfacing with the test node.
15. The system of embodiment 1, wherein the data fusion engine is configured to edit data saved to hierarchical data structure based on user input received via the user interface.
16. The system of embodiment 1, wherein the child nodes are defined by at least one of a file, a record, a field, a template, and an instance.
17. The system of embodiment 1, wherein the data fusion engine is in data communication with an integrated software-as-a-service (SaaS) tool;
    wherein the workflow is at least one of created and edited by the integrated SaaS tool based on user input received via the user interface; and
    wherein the data fusion engine is configured to log the workflow to the at least one child node after the workflow is at least one of created and edited by the integrated SaaS tool.
18. The system of embodiment 17, wherein the data fusion engine is configured to create and edit workflows independent of the integrated SaaS tool based on user input received via the user interface.
19. The system of embodiment 1, wherein the data fusion engine is configured to generate an index of all bill of materials (BOM) saved in the database; and wherein the user interface includes a BOM interface for displaying the index.

20. The system of embodiment 1, wherein the data fusion engine is configured to generate a queue including all completed, in progress, and/or pending tasks associated with workflows saved to the hierarchical data structure; and
wherein the user interface includes a queue interface for displaying the queue.

21. The system of embodiment 1, wherein the data fusion engine is in data communication with a test sensor configured to generate test data regarding a real-world inventory item;
wherein at least one of the child nodes is an inventory item node corresponding to the real-world inventory item; and
wherein the data fusion engine is configured to receive the test data from the test sensor and log the test data to the inventory item node.

22. The system of embodiment 1, wherein the data fusion engine is in data communication with a test sensor configured to generate test data regarding a part to be manufactured;
wherein at least one of the child nodes is a part node corresponding to the part to be manufactured; and
wherein the data fusion engine is configured to receive the test data from the test sensor and log the test data to the part node.

23. A system, comprising:
a client computer;
software executable by the client computer for providing a user interface;
a server in data communication with the client computer;
a database having a parent directory and nodes linked to the parent directory, each of the nodes associated with a respective real-world inventory item or a respective part to be manufactured;
a data fusion engine executing on the server, the data fusion engine configured to log a workflow to at least one of the nodes based on user input received via the user interface.

24. A method for managing resources and scheduling, comprising:
providing a user interface on a client computer;
storing data in a hierarchical data structure having a parent node and a plurality of child nodes; and
logging a workflow to at least one of the plurality of child nodes based on user input received via the user interface.

25. A non-transitory computer-readable storage medium that stores instructions to be executed by at least one computer, wherein the instructions cause the at least one computer to perform steps comprising:
providing a user interface on a client computer;
storing data in a hierarchical data structure having a parent node and a plurality of child nodes; and
logging a workflow to at least one of the plurality of child nodes based on user input received via the user interface.

26. A SaaS platform, comprising:
a server in data communication with a plurality of client computers;
a database for storing data in a hierarchical data structure having a parent node and child nodes linked to the parent node; and
a data fusion engine executing on the server, the data fusion engine configured to log a workflow to at least one of the child nodes based on user input received via at least one client computer of the plurality of client computers.

27. A system for performing an item workflow, the system comprising:
a database storing:
a hierarchical data structure comprising a parent node and child nodes linked to the parent node, a child node of the child nodes being associated with an item; and
a workflow template for defining a workflow comprising one or more tasks and one or more variables; and
a data fusion engine comprising non-transitory computer readable storage medium comprising program instructions stored thereon that are executable by a processor to perform the following operations:
receiving, via a user interface, user input comprising:
a user selection to log the workflow with the item; and
a data value;
in response to receiving the user input:
generating, based on the workflow template, a workflow instance node comprising:
the data value; and
a status of the one or more tasks of the workflow; and
linking, in the hierarchical data structure, the workflow instance node as a child of the child node associated with the item;
presenting, via a user interface, an indication of the workflow, the data value and the status of the one or more tasks of the workflow in association with the item;
receiving, via a user interface, a user selection to initiate the workflow for the item;
executing, in response to the user selection to initiate the workflow for the item, one or more tasks of the workflow;
updating, in response to execution of the one or more tasks of the workflow, the status of the one or more tasks of the workflow instance node to reflect execution of the one or more tasks of the workflow; and
presenting, via a user interface based on the updating of the status of the one or more tasks of the workflow instance node, an indication of the workflow, the data value and the updated status of the one or more tasks of the workflow in association with the item.

28. The system of embodiment 27, the operations further comprising:
monitoring the status of the one or more tasks of the workflow;
determining, based on the monitoring, a change in the status of the one or more tasks of the workflow; and
in response to determining the change in the status of the one or more tasks of the workflow, executing a workflow or transmitting an approval request to one or more users.

29. The system of embodiment 27,
wherein a workflow scope associated with the workflow template, and
wherein the workflow scope identifies child nodes to which the workflow template can be logged.

30. The system of embodiment 29, wherein the workflow scope for the workflow template defines one or more types of nodes to which the workflow template can be logged, the operations further comprising:
   determining, by a workflow scope selector based on the workflow scope associated with the workflow template, that the child node associated with the item is a type of node to which the workflow template can be logged,
   wherein the linking of the workflow instance node as a child of the child node associated with the item is performed responsive to the determining that the child node associated with the item is of the type of node to which the workflow template can be logged.

31. The system of embodiment 30, the operations further comprising:
   receiving a user selection to log the workflow with a second item;
   determining, by the workflow scope selector based on the workflow scope associated with the workflow template, that a second child node associated with the second item is not a type of node to which the workflow template can be logged; and
   not linking, responsive to determining that a second child node associated with the second item is not of the type of node to which the workflow template can be logged, the workflow instance node as a child of the second child node associated with the second item.

32. The system of embodiment 27, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

33. The system of embodiment 27, wherein the item comprises a part and the one or more tasks comprise testing or manufacturing of the part, wherein the one or more tasks of the workflow are executed, based on the linking of the workflow template with the item, to test or manufacture of the part.

34. A method for performing an item workflow, the method comprising:
   storing, in database:
      a hierarchical data structure comprising a parent node and child nodes linked to the parent node, a child node of the child nodes being associated with an item; and
      a workflow template for defining a workflow comprising one or more tasks and one or more variables;
   receiving, via a user interface, user input comprising:
      a user selection to log the workflow with the item; and
      a data value;
   in response to receiving the user input:
      generating, based on the workflow template, a workflow instance node comprising:
         the data value; and
         a status of the one or more tasks of the workflow; and
      linking, in the hierarchical data structure, the workflow instance node as a child of the child node associated with the item;
   presenting, via a user interface, an indication of the workflow, the data value and the status of the one or more tasks of the workflow in association with the item;
   receiving, via a user interface, a user selection to initiate the workflow for the item;
   executing, in response to the user selection to initiate the workflow for the item, one or more tasks of the workflow;
   updating, in response to execution of the one or more tasks of the workflow, the status of the one or more tasks of the workflow instance node to reflect execution of the one or more tasks of the workflow; and
   presenting, via a user interface based on the updating of the status of the one or more tasks of the workflow instance node, an indication of the workflow, the data value and the updated status of the one or more tasks of the workflow in association with the item.

35. The method of embodiment 34, the method further comprising:
   monitoring the status of the one or more tasks of the workflow;
   determining, based on the monitoring, a change in the status of the one or more tasks of the workflow; and
   in response to determining the change in the status of the one or more tasks of the workflow, executing a workflow or transmitting an approval request to one or more users.

36. The method of embodiment 34,
   wherein a workflow scope is associated with the workflow template, and
   wherein the workflow scope identifies child nodes to which the workflow template can be logged.

37. The method of embodiment 36, wherein the workflow scope for the workflow template defines one or more types of nodes to which the workflow template can be logged, the method further comprising:
   determining, by a workflow scope selector based on the workflow scope associated with workflow template, that the child node associated with the item is a type of node to which the workflow template can be logged,
   wherein the linking of the workflow instance node as a child of the child node associated with the item is performed responsive to the determining that the child node associated with the item is of the type of node to which the workflow template can be logged.

38. The method of embodiment 37, the method further comprising:
   receiving a user selection to log the workflow with a second item;
   determining, by the workflow scope selector based on the workflow scope associated with workflow template, that a second child node associated with the second item is not a type of node to which the workflow template can be logged; and
   not linking, responsive to determining that a second child node associated with the second item is not of the type of node to which the workflow template can be logged, the workflow instance node as a child of the second child node associated with the second item.

39. The method of embodiment 34, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

40. The method of embodiment 34, the method further comprising:
generating, based on the status of the one or more tasks associated with the item, a task queue indicating statuses of tasks associated with workflows templates of the hierarchical data structure; and
presenting, via a user interface, task queue.

41. The method of embodiment 34, wherein the item comprises a part and the one or more tasks comprise testing or manufacturing of the part, the method further comprising executing, based on the linking of the workflow template with the item, the one or more tasks of the workflow to test or manufacture of the part.

42. A non-transitory computer readable storage medium comprising program instructions stored thereon that are executable by a processor to perform the following operations for performing an item workflow:
storing, in database:
a hierarchical data structure comprising a parent node and child nodes linked to the parent node, a child node of the child nodes being associated with an item; and
a workflow template for defining a workflow comprising one or more tasks and one or more variables; receiving, via a user interface, user input comprising:
a user selection to log the workflow with the item; and
a data value; in response to receiving the user input:
generating, based on the workflow template, a workflow instance node comprising:
the data value; and
a status of the one or more tasks of the workflow; and
linking, in the hierarchical data structure, the workflow instance node as a child of the child node associated with the item;
presenting, via a user interface, an indication of the workflow, the data value and the status of the one or more tasks of the workflow in association with the item;
receiving, via a user interface, a user selection to initiate the workflow for the item;
executing, in response to the user selection to initiate the workflow for the item, one or more tasks of the workflow;
updating, in response to execution of the one or more tasks of the workflow, the status of the one or more tasks of the workflow instance node to reflect execution of the one or more tasks of the workflow; and
presenting, via a user interface based on the updating of the status of the one or more tasks of the workflow instance node, an indication of the workflow, the data value and the updated status of the one or more tasks of the workflow in association with the item.

43. The medium of embodiment 42, the operations further comprising:
monitoring the status of the one or more tasks of the workflow;
determining, based on the monitoring, a change in the status of the one or more tasks of the workflow; and
in response to determining the change in the status of the one or more tasks of the workflow, executing a workflow or transmitting an approval request to one or more users.

44. The medium of embodiment 42,
wherein a workflow scope is associated with the workflow template, and
wherein the workflow scope identifies child nodes to which the workflow template can be logged.

45. The medium of embodiment 44, wherein the workflow scope for the workflow template defines one or more types of nodes to which the workflow template can be logged, the operations further comprising:
determining, by a workflow scope selector based on the workflow scope associated with workflow template, that the child node associated with the item is a type of node to which the workflow template can be logged,
wherein the linking of the workflow instance node as a child of the child node associated with the item is performed responsive to the determining that the child node associated with the item is of the type of node to which the workflow template can be logged.

46. The medium of embodiment 45, the operations further comprising:
receiving a user selection to log the workflow with a second item;
determining, by the workflow scope selector based on the workflow scope associated with workflow template, that a second child node associated with the second item is not a type of node to which the workflow template can be logged; and
not linking, responsive to determining that a second child node associated with the second item is not of the type of node to which the workflow template can be logged, workflow instance node as a child of the second child node associated with the second item.

47. The medium of embodiment 42, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

48. The medium of embodiment 42, wherein the item comprises a part and the one or more tasks comprise testing or manufacturing of the part, and wherein the one or more tasks of the workflow are executed, based on the linking of the workflow template with the item, to test or manufacture of the part.

49. A method comprising:
storing, in database, the following:
a data structure comprising data associated with an item; and
a workflow template for defining a workflow comprising one or more tasks and one or more variables;
receiving, via a user interface, user input comprising:
a user selection to associate the workflow with the item; and
a data value; and
associating, with the item in response to receiving the user input, a workflow instance node corresponding to the workflow template.

50. The method of embodiment 49,
wherein the data structure comprises a hierarchical data structure comprising a parent node and child nodes linked to the parent node, wherein the data associated with the item comprising a child node of the child nodes associated with the item, and
wherein the associating comprises:
associating, in the hierarchical data structure, a workflow instance node as a child of the child node associated with the item, the workflow instance node comprising:
the data value; and
a status of the one or more tasks of the workflow.

51. The method of embodiment 49, the method further comprising: presenting, via a user interface, an indication of the workflow, the data value and the status of the one or more tasks of the workflow in association with the item.

52. The method of embodiment 49, the method further comprising:
receiving, via a user interface, a user selection to initiate the workflow for the item;
executing, in response to the user selection to initiate the workflow for the item, one or more tasks of the workflow;
updating, in response to execution of the one or more tasks of the workflow, the status of the one or more tasks of the workflow instance node to reflect execution of the one or more tasks of the workflow; and
presenting, via a user interface based on the updating of the status of the one or more tasks of the workflow instance node, an indication of the workflow, the data value and the updated status of the one or more tasks of the workflow in association with the item.

53. The method of embodiment 49, wherein the workflow template is associated with a workflow scope that identifies items to which the workflow template can be associated.

54. The method of embodiment 53, the method further comprising: determining, based on the workflow scope, that the item is an item to which the workflow template can be associated,
wherein the associating of the workflow instance node as a child of the child node associated with the item is performed responsive to the determining that the item is an item to which the workflow template can be associated.

55. The method of embodiment 54, the method further comprising:
determining, based on the workflow scope, that a second item is not an item to which the workflow template can be associated,
wherein a second workflow instance is not linked with the second item responsive to the determining that the item is not an item to which the workflow template can be associated.

56. The method of embodiment 49, wherein the item comprises a part and the one or more tasks comprise testing or manufacturing of the part, the method further comprising executing, based on the associating of the instance node as a child of the child node associated with the item, the one or more tasks of the workflow to test or manufacture of the part.

What is claimed is:

1. A system for performing an item workflow, the system comprising:
a database storing:
a hierarchical data structure comprising a parent node and child nodes linked to the parent node, a child node of the child nodes being associated with an item; and
a workflow template for defining a workflow comprising one or more tasks and one or more variables, the item comprising a part and the one or more tasks comprising testing or manufacturing of the part; and
a data engine comprising non-transitory computer readable storage medium comprising program instructions stored thereon that are executable by a processor to perform the following operations:
receiving, via a user interface, user input comprising:
a user selection to log the workflow with the item; and
a data value;
in response to receiving the user input:
generating, based on the workflow template, a workflow instance node comprising:
the data value; and
a status of the one or more tasks of the workflow; and
linking, in the hierarchical data structure, the workflow instance node as a child of the child node associated with the item;
presenting, via a user interface, an indication of the workflow, the data value and the status of the one or more tasks of the workflow in association with the item;
receiving, via a user interface, a user selection to initiate the workflow for the item; and
executing, in response to the user selection to initiate the workflow for the item, one or more tasks of the workflow to cause the performing of the testing or manufacturing of the part.

2. The system of claim 1, the operations further comprising:
monitoring the status of the one or more tasks of the workflow;
determining, based on the monitoring, a change in the status of the one or more tasks of the workflow; and
in response to determining the change in the status of the one or more tasks of the workflow, executing a workflow or transmitting an approval request to one or more users.

3. The system of claim 1,
wherein a workflow scope associated with the workflow template, and
wherein the workflow scope identifies child nodes to which the workflow template can be logged.

4. The system of claim 3, wherein the workflow scope for the workflow template defines one or more types of nodes to which the workflow template can be logged, the operations further comprising:
determining, by a workflow scope selector based on the workflow scope associated with the workflow template, that the child node associated with the item is a type of node to which the workflow template can be logged,
wherein the linking of the workflow instance node as a child of the child node associated with the item is performed responsive to the determining that the child node associated with the item is of the type of node to which the workflow template can be logged.

5. The system of claim 4, the operations further comprising:
receiving a user selection to log the workflow with a second item;
determining, by the workflow scope selector based on the workflow scope associated with the workflow template, that a second child node associated with the second item is not a type of node to which the workflow template can be logged; and
not linking, responsive to determining that a second child node associated with the second item is not of the type of node to which the workflow template can be logged, the workflow instance node as a child of the second child node associated with the second item.

6. The system of claim 1, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

7. The system of claim 1, the operations further comprising:
updating, in response to execution of the one or more tasks of the workflow, the status of the one or more tasks of the workflow instance node to generate an updated status that reflects execution of the one or more tasks of the workflow; and
presenting, via a user interface based on the execution of the one or more tasks of the workflow, an indication of the workflow, the data value and the updated status of the one or more tasks of the workflow in association with the item.

8. A method for performing an item workflow, the method comprising:
storing, in database:
a hierarchical data structure comprising a parent node and child nodes linked to the parent node, a child node of the child nodes being associated with an item; and
a workflow template for defining a workflow comprising one or more tasks and one or more variables, the item comprising a part and the one or more tasks comprising testing or manufacturing of the part;
receiving, via a user interface, user input comprising:
a user selection to log the workflow with the item; and
a data value;
in response to receiving the user input:
generating, based on the workflow template, a workflow instance node comprising:
the data value; and
a status of the one or more tasks of the workflow; and
linking, in the hierarchical data structure, the workflow instance node as a child of the child node associated with the item;
presenting, via a user interface, an indication of the workflow, the data value and the status of the one or more tasks of the workflow in association with the item;
receiving, via a user interface, a user selection to initiate the workflow for the item; and
executing, in response to the user selection to initiate the workflow for the item, one or more tasks of the workflow to cause the performing of the testing or manufacturing of the part.

9. The method of claim 8, the method further comprising:
monitoring the status of the one or more tasks of the workflow;
determining, based on the monitoring, a change in the status of the one or more tasks of the workflow; and
in response to determining the change in the status of the one or more tasks of the workflow, executing a workflow or transmitting an approval request to one or more users.

10. The method of claim 8,
wherein a workflow scope is associated with the workflow template, and
wherein the workflow scope identifies child nodes to which the workflow template can be logged.

11. The method of claim 10, wherein the workflow scope for the workflow template defines one or more types of nodes to which the workflow template can be logged, the method further comprising:
determining, by a workflow scope selector based on the workflow scope associated with workflow template, that the child node associated with the item is a type of node to which the workflow template can be logged,
wherein the linking of the workflow instance node as a child of the child node associated with the item is performed responsive to the determining that the child node associated with the item is of the type of node to which the workflow template can be logged.

12. The method of claim 11, the method further comprising:
receiving a user selection to log the workflow with a second item;
determining, by the workflow scope selector based on the workflow scope associated with workflow template, that a second child node associated with the second item is not a type of node to which the workflow template can be logged; and
not linking, responsive to determining that a second child node associated with the second item is not of the type of node to which the workflow template can be logged, the workflow instance node as a child of the second child node associated with the second item.

13. The method of claim 8, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

14. The method of claim 8, the method further comprising:
generating, based on the status of the one or more tasks associated with the item, a task queue indicating statuses of tasks associated with workflows templates of the hierarchical data structure; and
presenting, via a user interface, a task queue.

15. The method of claim 8, the method further comprising:
updating, in response to execution of the one or more tasks of the workflow, the status of the one or more tasks of the workflow instance node to generate an updated status that reflects execution of the one or more tasks of the workflow; and
presenting, via a user interface based on the execution of the one or more tasks of the workflow, an indication of the workflow, the data value and the updated status of the one or more tasks of the workflow in association with the item.

16. A non-transitory computer readable storage medium comprising program instructions stored thereon that are executable by a processor to perform the following operations for performing an item workflow:
  storing, in database:
    a hierarchical data structure comprising a parent node and child nodes linked to the parent node, a child node of the child nodes being associated with an item; and
    a workflow template for defining a workflow comprising one or more tasks and one or more variables, the item comprising a part and the one or more tasks comprising testing or manufacturing of the part;
  receiving, via a user interface, user input comprising:
    a user selection to log the workflow with the item; and
    a data value;
  in response to receiving the user input:
    generating, based on the workflow template, a workflow instance node comprising:
      the data value; and
      a status of the one or more tasks of the workflow; and
    linking, in the hierarchical data structure, the workflow instance node as a child of the child node associated with the item;
  presenting, via a user interface, an indication of the workflow, the data value and the status of the one or more tasks of the workflow in association with the item;
  receiving, via a user interface, a user selection to initiate the workflow for the item; and
  executing, in response to the user selection to initiate the workflow for the item, one or more tasks of the workflow to cause the performing of the testing or manufacturing of the part.

17. The medium of claim 16, the operations further comprising:
  monitoring the status of the one or more tasks of the workflow;
  determining, based on the monitoring, a change in the status of the one or more tasks of the workflow; and
  in response to determining the change in the status of the one or more tasks of the workflow, executing a workflow or transmitting an approval request to one or more users.

18. The medium of claim 16,
  wherein a workflow scope is associated with the workflow template, and
  wherein the workflow scope identifies child nodes to which the workflow template can be logged.

19. The medium of claim 18, wherein the workflow scope for the workflow template defines one or more types of nodes to which the workflow template can be logged, the operations further comprising:
  determining, by a workflow scope selector based on the workflow scope associated with workflow template, that the child node associated with the item is a type of node to which the workflow template can be logged,
  wherein the linking of the workflow instance node as a child of the child node associated with the item is performed responsive to the determining that the child node associated with the item is of the type of node to which the workflow template can be logged.

20. The medium of claim 19, the operations further comprising:
  receiving a user selection to log the workflow with a second item;
  determining, by the workflow scope selector based on the workflow scope associated with workflow template, that a second child node associated with the second item is not a type of node to which the workflow template can be logged; and
  not linking, responsive to determining that a second child node associated with the second item is not of the type of node to which the workflow template can be logged, workflow instance node as a child of the second child node associated with the second item.

21. The medium of claim 16, wherein the item is an item in inventory, and the child node comprises an inventory item node corresponding to the item, wherein the item is a part to be manufactured, and the child node comprises a part node associated with a design file for the part to be manufactured, or wherein the item is an item to be tested and the child node comprises test template node associated with testing of the item.

22. The medium of claim 16, the operations further comprising:
  updating, in response to execution of the one or more tasks of the workflow, the status of the one or more tasks of the workflow instance node to generate an updated status that reflects execution of the one or more tasks of the workflow; and
  presenting, via a user interface based on the execution of the one or more tasks of the workflow, an indication of the workflow, the data value and the updated status of the one or more tasks of the workflow in association with the item.

23. A non-transitory computer readable storage medium comprising program instructions stored thereon that are executable by a processor to perform the following operations:
  storing, in database, the following:
    a data structure comprising data associated with an item; and
    a workflow template for defining a workflow comprising one or more tasks and one or more variables, the item comprising a part and the one or more tasks comprising testing or manufacturing of the part;
  receiving, via a user interface, user input comprising:
    a user selection to associate the workflow with the item; and
    a data value;
  associating, with the item in response to receiving the user input, a workflow instance node corresponding to the workflow template, and
  executing, based on the associating of the instance node as a child of the child node associated with the item, the one or more tasks of the workflow to cause the performing of the testing or manufacturing of the part.

24. The medium of claim 23,
  wherein the data structure comprises a hierarchical data structure comprising a parent node and child nodes linked to the parent node, wherein the data associated with the item comprising a child node of the child nodes associated with the item, and
  wherein the associating comprises:
    associating, in the hierarchical data structure, a workflow instance node as a child of the child node associated with the item, the workflow instance node comprising:
      the data value; and
      a status of the one or more tasks of the workflow.

25. The medium of claim 23, the operations further comprising:
  presenting, via a user interface, an indication of the workflow, the data value and a status of the one or more tasks of the workflow in association with the item.

26. The medium of claim 23, the operations further comprising:
  receiving, via a user interface, a user selection to initiate the workflow for the item;
  executing, in response to the user selection to initiate the workflow for the item, one or more tasks of the workflow;
  updating, in response to execution of the one or more tasks of the workflow, a status of the one or more tasks of the workflow instance node to reflect execution of the one or more tasks of the workflow; and
  presenting, via a user interface based on the updating of the status of the one or more tasks of the workflow instance node, an indication of the workflow, the data value and an updated status of the one or more tasks of the workflow in association with the item.

27. The medium of claim 23, wherein the workflow template is associated with a workflow scope that identifies items to which the workflow template can be associated.

28. The medium of claim 27, the operations further comprising:
  determining, based on the workflow scope, that the item is an item to which the workflow template can be associated,
  wherein the associating of the workflow instance node as a child of the child node associated with the item is performed responsive to the determining that the item is an item to which the workflow template can be associated.

29. The medium of claim 27, the operations further comprising:
  determining, based on the workflow scope, that a second item is not an item to which the workflow template can be associated,
  wherein a second workflow instance is not linked with the second item responsive to the determining that the item is not an item to which the workflow template can be associated.

* * * * *